T. O. Schrader.
Thread Guide for Spools.
No. 45,271.  Patented Sept. 28, 1864.
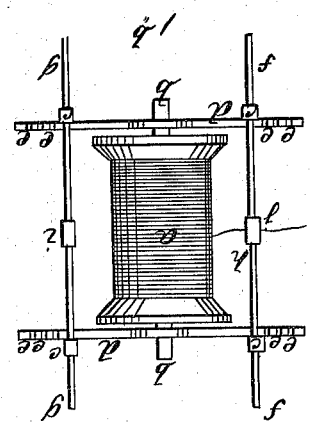
Fig. 1.
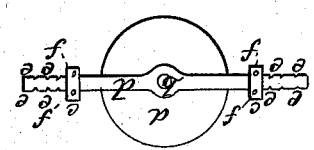
Witnesses
Chas. Williams
H. Rogers
Inventor
Theo. F. Schrader

United States Patent Office.

THEODORE O. L. SCHRADER, OF NEW YORK, N. Y.

Letters Patent No. 95,271, dated September 28, 1869; antedated September 15, 1869.

IMPROVEMENT IN THREAD-GUIDE FOR SPOOLS.

The Schedule referred to in these Letters Patent and making part of the same.

*To all whom it may concern:*

Be it known that I, THEODORE O. L. SCHRADER, of New York, in the county and State of New York, have invented a new and useful Improvement in Spool-Thread Guides; and I do hereby declare the following to be a full and correct description of the same, sufficient to enable others skilled in the art to which my invention appertains, to fully understand and construct the same, reference being had to the accompanying drawings, which make part of this specification, and in which—

Figure 1$^a$ is a perspective view of my improved spool-thread guide; and

Figure 1$^b$ is an end view of the same.

Like letters of reference indicate like parts in the several figures.

The nature of my invention consists in the peculiar construction of a spool-thread guide, so as to make it adjustable to spools of any size.

$a$, in figs. 1$^a$ and 1$^b$ of the drawings, may represent a spool of thread, the journal $b$ of which rests in suitable bearings in bars $d$, the ends of which are notched, as shown at $e$.

These bars $d$ are grasped by wires $f g$, which rest in notches $e$, and are clamped on the bars $d$ by means of nuts $c$, through which they pass, and which bear against the outer sides of bars $d$.

Secured on the wires $f g$, which pass through them, are short blocks $h i$, one of which, $h$, is provided with a hole, $j$, through which the thread passes, the block $i$ being made a little heavier, to serve as a counterpoise to block $h$.

It will be easily understood, that by sliding the nuts $c$ on the wire, and shifting the wires $f g$ into notches $e$, nearer to or further from the ends of bars $d$, the guide can be adjusted to the length and width of different-sized spools.

The operation of my device, as shown in figs. 1$^a$ and 1$^b$, is as follows:

The journals $b$ of the spool having been passed through the bearings in bars $d$, the latter are clamped between the wires $f g$, and held by nuts $c$, the wires being placed in such notches, $e e$, in bars $d$ as will allow the spool $a$ to move between them without touching them. Thus the wires can be adjusted to different-sized spools. The spool $a$ is now securely held in the frame or holder, and turns freely on its journals. The thread is passed through hole $j$ in block $h$, sliding on bars $f$, and the block $h$ may be adjusted to any suitable position on the bars.

The frame may be laid in suitable notches in a work-box, or otherwise attached, as is commonly done.

Having thus described my invention,

What I claim as new, and desire to secure by Letters Patent, is—

The spool-thread guide, when constructed substantially as described, and shown in figs. 1$^a$ and 1$^b$.

In testimony whereof, I have signed my name to this specification, in the presence of two subscribing witnesses.

THEO. O. L. SCHRADER.

Witnesses:
CHARLES E. FOSTER,
JOHN BULKLEY.